Nov. 23, 1943.  E. E. LYNCH  2,335,071
CONTROL SYSTEM
Filed July 3, 1942
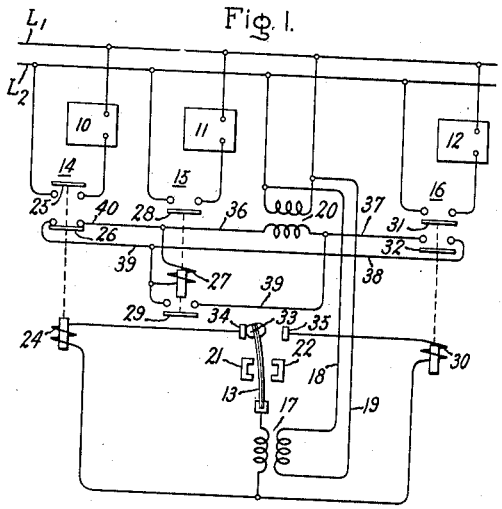
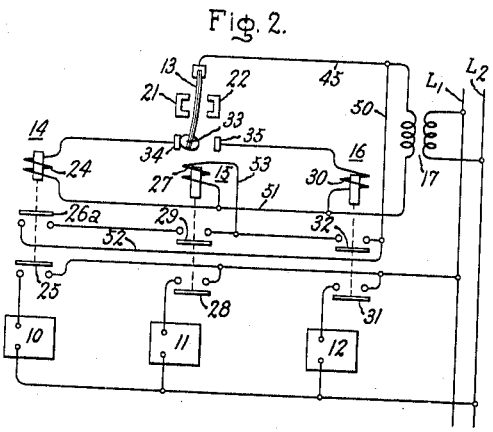
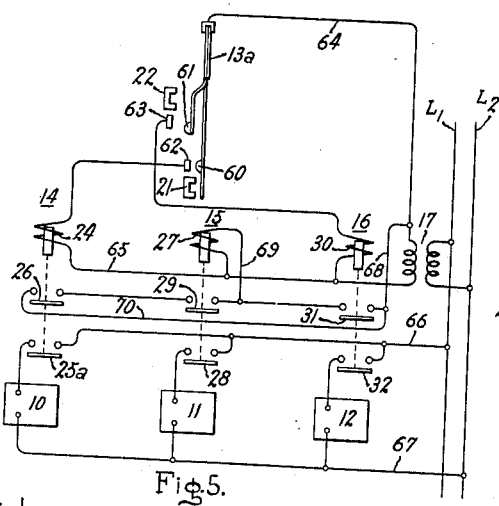
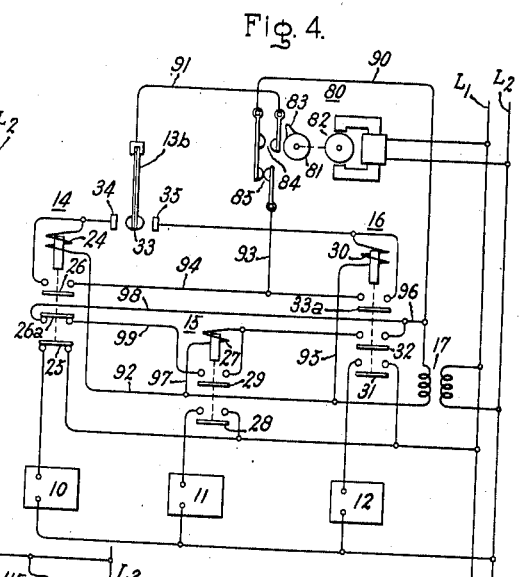
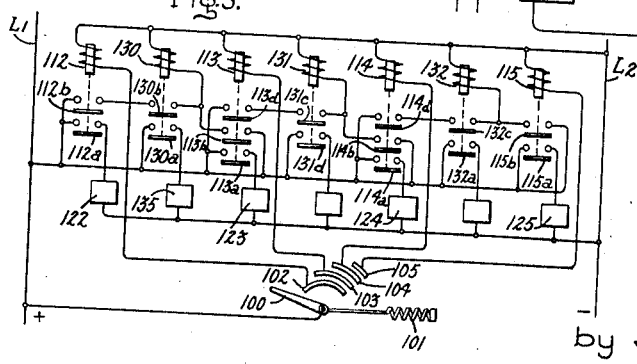
Inventor:
Edward E. Lynch,
by Harry E. Dunham
His Attorney.

Patented Nov. 23, 1943

2,335,071

UNITED STATES PATENT OFFICE 2,335,071

CONTROL SYSTEM

Edward E. Lynch, Easthampton, Mass., assignor to General Electric Company, a corporation of New York Application July 3, 1942, Serial No. 449,613

13 Claims. (Cl. 236—1)

This invention relates to control systems, particularly load balancing step control systems, and the principal object is to provide an improved condition responsive selective double and single step control system for automatically and selectively operating one or more of a plurality of condition changing devices to meet a variable load demand such, for example, as in regulating temperature, pressure, or other variable condition.

In accordance with the improved selective double and single step control principle of the present invention, a single control step is provided automatically upon each reversal in the trend of the load demand, while double steps are provided automatically only upon a continuance of the trend after any single control step is taken. Thus the improved selective double and single step control principle of the present invention enables a third load supply device to be started and stopped automatically to balance large variations in the load demand upon consecutive starting and stopping of a pair of load supply devices, each of which can be separately started and stopped automatically to balance small variations in the load demand. In this way a selective responsiveness of the control system to large and small variations in the load demand is provided and a more effective regulation of a controlled condition is obtained.

While the invention is herein illustrated and described as embodied in a temperature responsive selective heating unit control system, it is not limited thereto but may be employed with advantage in any condition responsive variable load control system.

A special object of the invention is to enable a condition responsive master switch having a series of circuit controlling positions for both separately and cumulatively controlling the operation of a plurality of condition changing devices to effect a concatenated selective control of a relay for controlling an additional condition changing device upon the cumulative as distinguished from the separate control operation of the master switch.

A more specific object is to provide a concatenated selective control of a third relay in accordance with the selective separate and consecutive control of a pair of relays by a condition responsive master switch in such a way that the energization of the third relay is controlled solely by a predetermined consecutive operation of one of the pair of relays, while the deenergization of the third relay is controlled solely by a predetermined consecutive operation of the other of the pair of relays.

By means of the improved concatenated selective relay control system, the selective control action of any ordinary two circuit selective master switch can be amplified and expanded so that one of three condition changing devices will be separately started and stopped as long as the load demand requires intermittent operation of only one device, but an additional two of the condition changing devices will be started simultaneously into operation when the load requirements increase, the second device then being maintained in operation until stopped simultaneously with the first device, and the third condition changing device will be separately started and stopped when the continued joint operation of the first and second devices is not sufficient to meet the load demand.

The improved concatenated selective relay control can be accomplished under the control of a two circuit selective master switch such, for example, as an ordinary three wire thermostat having a contact blade movable through an "off" position between two circuit closing contacts, since such a two circuit selective master switch actually provides four selective control conditions; namely, (1) one circuit closing contact is engaged by the thermostat blade, (2) the blade has disengaged said one contact and is moving through the "off" position to engage the other circuit closing contact, (3) the blade has disengaged said other contact and is moving through the "off" position to engage the said one circuit closing contact, and (4) the said other circuit closing contact is engaged by the blade. With the improved concatenated selective relay control combination embodying the present invention, under condition (1) all three of the condition changing devices will be shut off; under condition (2) one of the devices will be in operation; under condition (3) two of the devices will be in operation; and under condition (4) all three of the devices will be in operation.

Upon a continuous reverse variation of the thermostat temperature from condition (1) through (2) to (4) and return through (3) to (1), the three devices will be started into cumulative operation and stopped as indicated by the following sequence chart:

Thermostat condition  1  2  4  3  1
Devices in operation    0  1  3  2  0

Thus with the improved system, whenever a reversal in the temperature trend occurs so as to produce reverse transition between conditions (1) and (2) or between conditions (4) and (3), the system will automatically provide a single control step since only one device will be started or stopped. Yet whenever the reversed temperature trend continues through condition (2) or (3), then a double step is provided since two devices will be simultaneously or jointly started or stopped when condition (1) or (4) is reached.

The accompanying drawing illustrates various ways in which the present invention may be carried out. Fig. 1 is a circuit diagram of a heating control system embodying the invention and employing a single pole, double throw, snap action thermostatic master switch for selectively controlling the energization of three relays which in turn selectively control the energization of three heaters with the third relay energized from a different source than the other two so that it can be separately deenergized by short circuiting. Fig. 2 shows a modification of the invention employing a single pole, double throw, snap action master switch with all three of the control relays energized from the same source. Fig. 3 shows a further modification of the invention employing a different type of double circuit controlling snap action master switch. Fig. 4 shows a still further modification of the invention in which a non-snap action type of single pole, double throw master switch is combined with a continuously operating periodic contact mechanism to provide the improved concatenated selective condition responsive control. Fig. 5 shows schematically the invention applied to an ordinary type of condition responsive multi-circuit successive step controller to increase the number of load devices selectively controlled thereby.

In Fig. 1, the three condition changing devices 10, 11 and 12 may be assumed to be electric or other forms of heaters that are selectively energized from the supply lines L1, L2 so as to operate heater 10 alone or jointly with heater 11 and, in addition, heater 12 to supply a common heating load or demand under the control of the single pole, double throw master heating control three wire thermostat 13 selectively operating through the agency of the interconnected relays 14, 15 and 16. The two relays 14 and 16 are shown with their windings 24 and 30 connected to the low voltage transformer 17 having its primary continuously energized from the supply lines L1, L2 through the conductors 18 and 19. The relay 15 is shown with winding 27 connected to a separate transformer 20 which similarly has its primary continuously energized from the supply lines L1, L2. Relay 14 is of the normally closed type so that when its energizing winding 24 is unenergized, the main contact 25 is closed although the auxiliary contact 26 is open. Relay 15 is of the normally open type so that when its energizing winding 27 is unenergized, both the main contact 28 and the auxiliary contact 29 are open. Relay 16 also is of the normally open type such that when its energizing winding 30 is unenergized, both the main contact 31 and the auxiliary contact 32 are open.

Operation of Fig. 1

As long as there is no demand for heat, the temperature to which thermostat 13 is responsive necessarily is above the desired value. The movable thermostat contact 33 that is connected with transformer 17 therefore will be in its selective circuit closing position wherein the left-hand stationary contact 34 is engaged thereby completing a circuit to maintain winding 24 of relay 14 energized. Under these conditions, all three of the heating devices 10, 11 and 12 are disconnected from the supply lines L1, L2. When a demand for heating occurs, the temperature will decrease sufficiently for thermostat 13 to move contact 33 away from contact 34 into an intermediate circuit opening or "off" position between contacts 34 and 35 with a snap action due to magnet 21. Thereupon relay 14 will be deenergized. As a result, contact 25 will close to energize heater 10. Contact 26 of relay 14 also opens to remove the short circuit across the winding 27 of relay 15.

In case the operation of heater 10 alone is more than sufficient to meet the heating demand, the temperature to which the thermostat 13 is subjected will rise due to operation of heater 10 and contact 33 will return to its selective circuit closing position with contact 34 with a snap action, thereby re-energizing relay 14 to stop the separate operation of the heater 10. It also closes the short circuit across winding 27 of relay 15. In case, however, the separate operation of heater 10 is not sufficient to meet an increased heating demand, then thermostat 13 will continue movement of contact 33 through its intermediate circuit opening or "off" position to the right until it reaches its selective circuit closing position with right-hand contact 35 with a snap action due to magnet 22. This energizes the operating winding 30 of relay 16 from the secondary of transformer 17. The resulting response of relay 16 starts operation of the heater 12 due to closure of contact 31. The simultaneous closure of the relay contact 32 energizes winding 27 of relay 15 through conductors 36, 37 and 38 from the secondary of transformer 20. The resulting response of relay 15 then starts operation of heater 11 due to closure of contact 28. The simultaneous closure of relay contact 29 provides a sealing or holding circuit for relay 15, this circuit extending from the secondary of transformer 20 through conductor 39, contact 29, the winding 27 of relay 15 and conductor 36.

Under the conditions just noted, all three of the heaters 10, 11 and 12 are in joint operation. In case, however, their combined heat output is more than sufficient to supply the heating demand, the thermostat 13 will soon move its contact 33 out of its selective circuit closing position with contact 35 with a snap action into its intermediate "off" position. This results in deenergizing relay 16 and thereby separately deenergizing heater 12. However, the two heaters 10 and 11 will remain in joint operation due to the fact that relay 14 is deenergized and its contact 25 remains in the normally closed position and relay 15 remains energized due to its sealing circuit.

If the combined heat output of the two heaters 10 and 11 is not sufficient to meet the heating demand, then thermostat 13 will return contact 33 into its selective circuit closing position with contactor 35 with a snap action, thereby re-energizing relay 16 and separately starting the heater 12 into joint operation with heaters 10 and 11.

If, however, the combined output of the two heaters 10 and 11 is more than sufficient to supply the heating demand, then thermostat 13 will continue movement of contact 33 to the left through its circuit opening or "off" position until it reaches its circuit closing position with contact 34 with a snap action. This results in energizing the relay 14. The energization of the operating winding 24 of relay 14 serves to open the contact 25 thereby deenergizing the heater 10. At the same time, the normally open auxiliary contact 26 is closed thereby short-circuiting the energizing winding 27 of relay 15 through conductors 39 and 40 so as to effect the opening of both of the relay contacts 28 and 29. The opening of contact 28 deenergizes heater 11 while the opening of contact 29 breaks the sealing circuit of relay 15. Thus all three of the heaters 10, 11 and 12 are again de-energized.

Thus it will be seen that the improved control system and apparatus of the present invention enable either one, two or three of the heaters to be maintained selectively in operation in accordance with the heating demand by means of the two selective circuit controlling thermostat 13.

Referring now to the modified system of Fig. 2, the double circuit, three wire thermostat 13 controls the three relays 14, 15 and 16 to energize the heaters 10, 11 and 12 from the supply lines L1, L2 in exactly the same sequence under varying load conditions, as described in connection with Fig. 1. However, the relay interconnection arrangement is modified so that instead of short-circuiting the third relay 15 to drop it out, an open circuiting type of control is provided. To accomplish this, the auxiliary contact 26a of relay 14 is of the normally closed rather than the normally open type.

*Operation of Fig. 2*

When the temperature to which thermostat 13 is subjected is above the desired value, thermostat contact 33 will move into its selective circuit closing position with contact 34 with a snap action to energize the operating winding 24 of relay 14 through conductors 45 and 51 from the secondary of the low voltage transformer 17 having its primary continuously energized from the supply lines L1, L2. Under these conditions, all three of the heaters 10, 11 and 12 are deenergized. When a demand for heating occurs, thermostat 13 will respond to the decrease in temperature to which it is subjected by moving contact 33 out of engagement with contact 34 and into its intermediate circuit opening or "off" position with a snap action. This results in deenergizing relay 14 and, therefore, the closing of contact 25 to energize heater 10 from the supply lines L1, L2. The closure of the auxiliary contact 26a accomplishes nothing since both relays 15 and 16 are deenergized. If the heat output of heater 10 is more than sufficient to meet the heating demand, then thermostat 13 will return its contact 33 into its selective circuit closing position with contact 34 with a snap action thereby reenergizing relay 14 and deenergizing heater 10. If, however, the output of heater 10 is not sufficient to meet the heating demand, then thermostat 13 will continue to move its contact 33 to the right through its intermediate circuit opening or "off" position until it reaches its selective circuit closing position with contact 35 with a snap action thereby energizing the operating winding 30 of relay 16 through conductors 45 and 51 from the secondary of transformer 17. As a result, relay 16 closes its contact 31 to energize heater 12 from the supply lines L1, L2 and, at the same time, closes its auxiliary contact 32 to energize the operating winding 27 of relay 15, the circuit extending through conductor 50, contact 32, winding 27 and conductor 51. As a result, relay 15 closes its contact 28 to energize heater 11 from supply lines L1, L2 and, at the same time, closes its auxiliary contact 29 to establish a sealing circuit for maintaining winding 27 energized independently of the contact 32. This sealing circuit extends from conductor 50 through conductor 52, the normally closed auxiliary contact 26a of relay 14, contact 29, conductor 53, winding 27 and conductor 51.

Under the conditions just described, all three of the heaters 10, 11 and 12 are energized and in operation. If their combined heat output exceeds the demand, the thermostat 13 will move contact 33 out of engagement with contact 35 with a snap action. This will deenergize relay 16 and the relay contact 31 will open to deenergize heater 12. At the same time contact 32 opens but the operating winding 27 of relay 15 remains energized through the sealing circuit previously described. In case the heat output of the two heaters 10 and 11 is not sufficient to meet the demand, then the thermostat 13 will return contact 33 into engagement with contact 35 with a snap action to re-energize relay 16 and thereby again start heater 12 into operation. If, however, the output of the two heaters 10 and 11 is more than sufficient to meet the demand, the thermostat contact 33 will continue to move to the left until it engages with contact 34 with a snap action. This engagement will result in energizing the operating winding 24 of relay 14 thereby causing relay 14 to open its contact 25 to deenergize heater 10 and, at the same time, open its auxiliary contact 26a to break the sealing circuit of the relay 15. When the auxiliary contact 26a opens to break the sealing circuit, relay 15 is deenergized and opens its contact 28 to deenergize heater 11 and, at the same time, open its auxiliary contact 29. In this way, all of the the three heaters 10, 11 and 12 are disconnected from the supply lines L1, L2. Thus it will be seen that the embodiment of the invention shown in Fig. 2 enables either one, two or three of the heaters 10, 11 and 12 to be operated in accordance with the heating demand.

Referring now to Fig. 3, a modified form of thermostat 13a is shown having a pair of contacts 60 and 61 which are operated in sequence into engagement with the stationary contacts 62 and 63 to control the sequential operation of relays 14, 15 and 16 and the resulting energization of heaters 10, 11 and 12 from the supply lines L1, L2 in substantially the same manner as in the control systems of Fig. 1 and Fig. 2. When the temperature to which thermostat 13a is responsive is above the desired value, then both of the contacts 60 and 61 are out of engagement with their cooperating contacts, and all of the relays 14, 15 and 16 are deenergized and, therefore, all the heaters 10, 11 and 12 are disconnected from the supply lines.

*Operation of Fig. 3*

When a demand for heating arises, thermostat 13a first operates its contact 60 into engagement with contact 62 with a snap action due to magnet 21. This results in energizing the operating winding 24 of relay 14 from the secondary of the low voltage transformer 17, the circuit extending through the conductor 64, contacts 60—62, the winding 24 and conductor 65. The resulting closure of relay contacts 25a energizes heater 10 from the supply lines L1, L2 through the conductors 66 and 67. The resulting closure of relay contact 26 accomplishes nothing as both relays 15 and 16 are deenergized.

If the output of heater 10 alone is more than sufficient to meet the heating demand, then thermostat 13a will disengage its contact 60 from contact 62 with a snap action thereby deenergizing relay 14 and correspondingly deenergizing heater 10. If, however, the output of heater 10 is not sufficient to meet the demand, then thermostat 13a, while maintaining its contact 60 in engagement with contact 62, at the same time, will operate its contact 61 towards contact 63. When contact 61 engages with contact 63 with a snap action due to magnet 22, the operating winding 30 of relay 16 is energized from the secondary of transformer 17 through conductors 64 and 65. This causes relay 16 to close its contact 32 to energize heater 12 from supply lines L1, L2 through conductors 66, 67. The simultaneous closure of contact 31 of relay 16 serves to energize the operating winding 27 of relay 15, the circuit extending through conductor 68, contact 31, conductor 69, winding 27 and conductor 65. Thereupon relay 15 closes its contact 28 to energize heater 11 from supply lines L1, L2 through conductors 66, 67. The simultaneous closure of auxiliary contact 29 establishes a sealing circuit for maintaining the winding 27 energized from the supply lines L1, L2 independently of the contact 31. This sealing circuit extends from the winding 27 through conductor 69, contact 29 of relay 15 and contact 26 of relay 14, and conductors 70 and 68, low voltage winding of transformer 17 and conductor 65.

Thus, under the conditions just described, all three of the heaters 10, 11 and 12 are energized from the supply lines. In case their combined output is more than sufficient to meet the demand, then thermostat 13a will respond to the increasing temperatures to move its contact 61 out of engagement with contact 63 with a snap action. This results in deenergizing relay 16 to effect opening of its contacts 31, 32. The opening of contact 32 deenergizes heater 12, but the opening of contact 31 does not effect deenergization of relay 15 since relay 15 is maintained energized through its sealing circuit previously described.

Under the conditions just described, the two heaters 10 and 11 are in operation. If their joint output is insufficient to meet the demand, then thermostat 13a returns contact 61 into engagement with contact 63 to re-energize relay 16 and thereby reclose contact 32 to re-energize heater 12. If, however, the joint output of the two heaters 10 and 11 is more than sufficient to meet the demand, then thermostat 13a will respond to the increasing temperature by disengaging contact 60 from contact 62 with a snap action. This will deenergize the operating winding 24 of relay 14. The resulting opening of the relay contact 25a will disconnect heater 10 from the supply lines. At the same time, the opening of auxiliary contact 26 will break the sealing circuit of relay 15 thereby deenergizing the opening winding 27 and opening contact 28 to disconnect heater 11 from the supply lines.

In case a demand for heating still exists, then thermostat 13a will return its contact 60 into engagement with contact 62 with a snap action to re-energize relay 14 and reclose contact 25a to reconnect heater 10 to the supply lines. Thus it will be seen that the improvements of the present invention enable the modified form of double contact thermostat 13a to effect selective operation of either one, two or three of the heaters in accordance with the heating demand.

Fig. 4 shows a modification of the invention that enables a non-snap action double circuit controlling three wire thermostat to operate in conjunction with a continuously operating periodic sequential contact making and breaking device 80 to provide substantially the same selective sequential control of the three heaters 10, 11 and 12 as in the control arrangements of the previous figures. As shown diagrammatically, the periodic contact device 80 is of the type described and claimed in the Crago Patent 2,202,731, and consists of a cam 81 continuously driven by the timing electric motor 82 energized from the supply lines L1, L2 so that the finger 83 will during each revolution of cam 81 periodically effect engagement between contacts 84 before temporarily breaking the engagement between contacts 85. During the major portion of the revolution of cam 81 the finger 83 is ineffective and the contacts 84 remain out of engagement and the contacts 85 remain in engagement.

In the control arrangement of Fig. 4, the relay 14 is provided with a main normally closed contact 25 for controlling heater 10, a normally closed auxiliary contact 26a and also a normally open auxiliary contact 26. Likewise, relay 16 is provided with a normally open main contact 31 for controlling the energization of heater 12 and a pair of normally open auxiliary contacts 32 and 32a, while relay 15 requires only the normally open main contact 28 for controlling energization of heater 11 and the normally open auxiliary contact 29.

*Operation of Fig. 4*

As shown in Fig. 4, the movable contact 33 of thermostat 13b is midway between its contacts 34 and 35 and all of the relays 14, 15 and 16 are deenergized. Therefore, the normally closed main contact 25 of relay 14 connects heater 10 to the supply lines L1, L2 and hence heater 10 alone is in operation. If the heat output of heater 10 is more than sufficient to meet the demand, thermostat 13b responds to the increase in temperature to move contact 33 into engagement with contact 34. Thus during the relatively short interval that finger 83 of the periodic control device 80 effects sequential engagement of contacts 84 and disengagement of contacts 85, an energizing circuit for the operating winding 24 of relay 14 is established, the circuit extending from the secondary of transformer 17 through conductor 90, contacts 84, conductor 91, contacts 33, 34, winding 24 and conductor 92. The resulting opening of contact 25 deenergizes the heater 10. When finger 83 operates to re-engage contacts 85 before disengaging contacts 84, a holding circuit for maintaining the winding 24 energized independently of the thermostat 13b is established. This holding circuit extends from the secondary of transformer 17 through conductor 90, contacts 85, conductors 93 and 94, relay contact 26, the winding 24 and conductor 92. Due to this holding circuit, relay 14 will be maintained energized until finger 83 is again rotated to effect sequential engagement of contacts 84 and 85, irrespective of the operation of thermostat 13b to move contact 33 out of engagement with contact 34. Thus on the succeeding operation of the periodic control finger 83, the holding circuit for relay 24 will be broken by the disengagement of contacts 85. Then, if contact 33 of the thermostat 13b is in its mid position, as shown, relay 24 will become deenergized and its normally closed contact 25 will re-energize heater 10.

In case the output of heater 10 operating alone is not sufficient to meet the demand, then thermostat 13b will move contact 33 into engagement with contact 35. Thus, upon the next succeeding revolution of the finger 83 to engage contacts 85, an energizing circuit for the winding 30 of relay 16 will be established, this circuit extending through conductor 90, contacts 84, conductor 91, contacts 33, 35, winding 30, conductors 95 and 92. Upon the resulting closure of relay 16, contact 31 energizes heater 12 from the supply lines L1, L2, while contact 32 establishes an energizing circuit for the winding 27 of relay 15, this circuit extending from the secondary of transformer 17 through conductor 96, contact 32, winding 27, conductors 97 and 92. The resulting closure of the relay contact 28 energizes heater 11, while the closure of auxiliary contact 29 establishes a holding circuit for maintaining the winding 27 energized independently of the contact 32. This holding circuit extends from the conductor 96 through conductor 98, normally closed auxiliary contact 26a of relay 14, conductor 99, contact 29, winding 27 and conductors 97 and 92. It should be noted that this holding circuit for relay 15 is entirely independent of the periodic control device 80. (The closure of auxiliary contact 33a of relay 16 establishes a holding circuit for winding 30 that is under the control of the periodic control device 80, this circuit extending from secondary transformer 17 through conductor 90, contact 85, conductors 93 and 94, contact 33a, winding 30 and conductors 95 and 92.)

Under the conditions just described, all three of the heaters 10, 11 and 12 are energized from the supply lines L1, L2. If their combined output is more than sufficient to meet the demand, thermostat 13b will move its contact 33 out of engagement with contact 35. However, relay 16 remains energized through its holding circuit previously described until finger 83 is revolved to effect sequential engagement of contacts 84 and disengagement of contacts 85. Under these conditions, relay 16 is deenergized due to the opening of the holding circuit for winding 30 by the disengagement of contacts 85. Thereupon relay 16 opens all of its contacts. The opening of contact 31 deenergizes heater 12 and the opening of contact 33a opens the holding circuit for winding 30. But the opening of contact 32 accomplishes nothing since the winding 27 of relay 15 is maintained energized through its own holding circuit that is independent of the periodic control 80.

Under the conditions just described the two heaters 10 and 11 will be maintained in operation. If their output is insufficient to meet the demand, then relay 16 will again be energized in the manner previously described to reconnect heater 12 to the supply lines. If, however, the output of the two heaters 10 and 11 is more than sufficient to meet the demand, thermostat 13b will move contact 33 into engagement with contact 34. Thus, during the relatively short interval that finger 83 engages contacts 84, the operating winding 24 of relay 14 will be energized in the manner previously described to effect opening of the normally closed relay contacts 25 and 26a and closure of the normally open contact 26. The opening of contact 25 serves to deenergize heater 10. The opening of contact 26a breaks the holding circuit of relay 15 thereby deenergizing that relay and effecting the opening of contact 28 to deenergize heater 11. The closure of contact 26 establishes the holding circuit for winding 24 in the manner previously described so as to maintain relay 14 deenergized until the next succeeding revolution of the finger 83 effects sequential operation of the contacts 84 and 85.

Thus it will be seen that the improvements of the present invention enable the double contact, non-snap action thermostat 13b to operate in conjunction with the periodic control device 80 to effect selective operation of either one, two or three of the heaters in the same sequence as provided in the control systems of the other figures.

Fig. 5 shows schematically how the present invention may be applied to an ordinary form of condition responsive multi-circuit successive controller in order to increase the number of devices controlled and thereby increase the sensitivity and accuracy of the control. As shown schematically, the master switch blade 100 is operated by a condition responsive device such as the helical bimetal element 101 to engage successively with the contacts 102, 103, 104, and 105 and thereby energize successively the corresponding relays 112, 113, 114, and 115 from the supply lines L1, L2 and to disengage successively these contacts to deenergize these relays in reverse order. Each of the relays 112—115 is provided with a main controlling contact 112a—115a for energizing and deenergizing a corresponding one of the condition changing means 122—125 in accordance with the energization and deenergization of the relays. In accordance with the present invention, each pair of the relays 112—115 has an additional one of the relays 130—132 interconnected in concatenated selective control relation similar to that described in connection with Fig. 2 so that energization of the additional relay is controlled by one of the pair of relays and its deenergization is controlled by the other of the pair of relays.

*Operation of Fig. 5*

As shown, relay 113 is provided with the auxiliary contact 113b so as to energize the operating winding of relay 130 upon the closure of contact 113b when relay 113 is energized at the corresponding control position of master switch 100 to engage contact 103. The relay 130 is provided with a main control contact 130a so that it may control a corresponding condition changing device 135. Thus upon energization of relay 130, its auxiliary contact 130b closes to establish a holding circuit for maintaining relay 130 energized. This holding circuit of relay 130 extends through auxiliary contact 112b of relay 112. Thus upon operation of the master switch 100 to the adjacent control position to deenergize relay 113, relay 130 remains energized until the master switch 100 operates to the next adjacent control position to deenergize relay 112. Thereupon, the opening of auxiliary contact 112a interrupts the holding circuit for relay 130 and thereby effects deenergization of this relay.

As shown in the drawing, the other pairs of relays 113—114 and 114—115 are each connected to control in concatenated selective relation the control relays 131 and 132 in exactly the same way as described in connection with relay 130, the b relay auxiliary contacts serving to complete the energizing circuit, the c relay auxiliary contacts serving to establish the holding circuit, and the d auxiliary contacts serving to interrupt the holding circuit in each case.

Thus it would seem that by means of the present invention, three relays with their corresponding condition changing devices may be selectively controlled by each pair of circuit controlling contacts with which the master switch 100 cooperates, thereby increasing the range sensitivity and accuracy of control.

What I claim as new and desire to secure by Letters Patent of the United States is:

1. In combination, a plurality of load supply devices having a common variable load, cumulative operation control means therefor including a load responsive control element having a series of circuit controlling means operated thereby for consecutively starting a portion of said devices into joint operation and reversely operable thereby for consecutively stopping operation of said portion of said devices in reverse order, and each of said circuit controlling means being separately and reversely operable by said element for selectively starting and stopping operation of a corresponding one of said portion of said devices to balance said load, a relay for controlling the starting and stopping of an additional one of said devices to balance said load, and means for energizing and deenergizing said relay only upon consecutive operation of a predetermined pair of said circuit controlling means.

2. In combination, three load supply devices having a common variable load, cumulative operation control means including a load responsive element and a pair of control means consecutively operable thereby, each for reversely controlling the operation of a corresponding one of a pair of said devices to balance said load, a relay for reversely controlling the operation of the third of said devices to balance said load, and means for energizing and deenergizing said relay only upon consecutive operation of said pair of control means.

3. In combination, three load supply devices having a common variable load, cumulative operation control means therefor including a load responsive master switch having an "off" position intermediate a first and a second circuit closing positions, and a pair of relays, each connected to be separately energized by said master switch upon operation thereof to a corresponding one of said circuit closing positions and deenergized in said "off" position, the first of said relays being effective upon deenergization thereof to start operation of a corresponding one of said devices and stop said operation upon energization of said one relay and the second of said relays being effective upon energization thereof to start operation of another of said devices and stop said operation upon deenergization of said other relay, a third relay for controlling the operation of a third one of said devices, and means for energizing and deenergizing said third relay only upon consecutive opposite changes in the energization of said first and second relays.

4. In a variable load control system, a pair of electroresponsive load control devices, means including a double circuit controlling switch for separately and consecutively controlling operation of said load control devices to reversely vary the load, and a third electroresponsive load control device having energizing means rendered effective and ineffective in response to reverse consecutive operation of said pair of control devices.

5. In a variable load control system, a pair of electroresponsive load control devices, means including a double circuit controlling switch for oppositely varying the energization of said devices separately and consecutively to oppositely vary the load, and a third electroresponsive load control device having energizing means rendered effective and ineffective in response to consecutive opposite variation of the energization of said pair of control devices.

6. In combination, a plurality of condition changing devices having a common variable load and each having a relay for starting and stopping operation thereof, a condition responsive device having means for selectively controlling the energization of a pair of said relays to start consecutively and stop consecutively the corresponding pair of devices in reverse order, one of said pair of relays having means for controlling the energization of a third one of said relays to effect joint operation of the condition changing device controlled by said third relay with the corresponding condition changing devices controlled by said pair of relays, means controlled by said third relay for controlling the energization thereof to continue joint operation of said third device with the other of said pair of devices upon operation of said one relay to stop operation of the device controlled thereby, and means controlled by the other of said pair of relays for controlling the energization of said third relay to stop operation of said third device upon the stopping of operation of the device controlled by said other relay.

7. In combination, a plurality of condition changing devices having a common variable load and each having a relay for starting and stopping operation thereof, one of the said relays having an energizing circuit and a holding circuit, a condition responsive device having means for selectively controlling the energization of a pair of said relays to start operation of the corresponding pair of devices in sequence, the second of said pair of relays having an auxiliary contact for closing the said energizing circuit of said one relay to effect joint operation of the corresponding one device with said pair of devices, an auxiliary contact operated by said one relay for closing said holding circuit to continue joint operation of said one device with the first of said pair of devices upon the selective operation of said second relay to stop operation of the device controlled thereby, and an auxiliary contact operated by the first of said pair of relays for interrupting the holding circuit of said one relay to stop operation of said one device upon the stopping of operation of the device controlled by said first relay.

8. In combination, a plurality of condition changing devices having a common variable load, control means therefor including a condition responsive switch having a pair of relays selectively controlled thereby for separately starting and stopping operation of a pair of said devices in reverse sequence, a third relay for controlling the operation of a third one of said devices, said third relay having an energizing circuit connected to be closed by one of said relays to effect joint operation of said third device with said pair of devices and having a holding circuit connected to be closed jointly by said third relay and the other of said pair of relays to effect the stopping of operation of said third device upon the stopping of operation of the device controlled by said other relay.

9. In combination, a plurality of condition changing devices having a common variable load, a relay having a normally closed contact for starting operation of one of said devices upon deenergization of said relay, a second relay having a normally open contact for starting operation of another one of said devices upon energization of said relay, a condition responsive double circuit controlling switch having an "off" position intermediate two circuit closing positions for selectively controlling the energization of said first and second relays to start and stop operation of the corresponding devices in reverse sequence, a third relay having a normally open contact for starting operation of a third one of said devices upon energization of said third relay, said third relay having an energizing circuit connected to be closed upon energization of said second relay to effect joint operation of said third device with said pair of devices and having a holding circuit connected to be closed jointly by said third relay and said first relay to effect the stopping of operation of said third device upon the energization of said first relay.

10. In combination, a plurality of condition changing devices having a common variable load and each having a relay for starting and stopping operation thereof, each of said relays having an energizing circuit and a holding circuit, control means therefor including a condition responsive double circuit controlling switch, a continuously operating periodic circuit controlling switch interconnected with said condition responsive switch for periodically and selectively establishing an energizing circuit for a pair of said relays for a limited interval and for maintaining the holding circuit established for the selected relay during the time between said intervals, one of said pair of relays having auxiliary contact means for establishing the energizing circuit of a third relay to effect joint operation of the condition changing device controlled by said third relay with the condition changing devices controlled by said pair of relays, said third relay having an auxiliary contact for closing the holding circuit thereof, and the other of said pair of relays having a contact for interrupting the holding circuit of said third relay to stop operation of the condition changing device controlled by said third relay upon the stopping of operation of the condition changing device controlled by said other relay.

11. A load control system having, in combination, a load responsive element reversely movable in accordance with reverse variation in the load over a predetermined range, a first load control means reversely operated by said element when the load decreases to and increases from the lower limit of said range, a second load control means reversely operated by said element when the load increases to and decreases from the upper limit of said range, and electroresponsive load control means having an energizing circuit connected to be closed under the control of said second control means when the load increases to said upper limit and having a holding circuit connected to be closed upon energization of said electroresponsive means and opened under the control of said first control means when the load decreases to said lower limit.

12. A selective double and single step control system having, in combination, a condition responsive circuit controlling element reversely movable at each of a pair of circuit controlling positions upon reverse variation in a predetermined condition, a pair of electroresponsive single step control means each connected for reversible single step control operation under the control of said element upon reverse movement thereof at a corresponding one of said circuit controlling positions, and electroresponsive double step control means interconnected with said pair of reversible single step control means for joint operation with each one thereof after a predetermined reverse operation of the other.

13. In combination, three electroresponsive load control devices, a reversely movable master control switch member having connections for consecutively varying the energization of a pair of said devices and for separately and oppositely varying the energization of each of said devices upon different reverse movements of said member, and connections controlled by said pair of devices for energizing and deenergizing the third one of said devices only upon consecutive variation in the energization of said pair of devices.

EDWARD E. LYNCH.